US00RE46236E

(19) United States
(12) Reissued Patent
Harter

(10) Patent Number: US RE46,236 E
(45) Date of Reissued Patent: Dec. 13, 2016

(54) SELF-PROGRAMMABLE THERMOSTAT

(71) Applicant: Honeywell International Inc., Morris Plains, NJ (US)

(72) Inventor: Robert J. Harter, LaCrosse, WI (US)

(21) Appl. No.: 14/714,535

(22) Filed: May 18, 2015

Related U.S. Patent Documents

Reissue of:
(64) Patent No.: 7,784,704
Issued: Aug. 31, 2010
Appl. No.: 11/704,414
Filed: Feb. 9, 2007

U.S. Applications:
(63) Continuation of application No. 13/551,543, filed on Jul. 17, 2012, now Pat. No. Re. 45,574, which is an application for the reissue of Pat. No. 7,784,704.

(51) Int. Cl.

| | |
|---|---|
| ***F24F 11/053*** | (2006.01) |
| ***G05D 23/12*** | (2006.01) |
| ***G05D 23/185*** | (2006.01) |
| ***G05D 23/32*** | (2006.01) |
| ***G05D 23/00*** | (2006.01) |

(Continued)

(52) U.S. Cl.
CPC ..... *F24F 11/0012* (2013.01); *F24F 11/06* (2013.01)

(58) Field of Classification Search
CPC ..... F24F 11/0012; F24F 11/06
USPC ..... 236/1 C, 46 C, 44 C
See application file for complete search history.

(56) References Cited

U.S. PATENT DOCUMENTS

| | | |
|---|---|---|
| 2,202,008 A | 5/1940 | Ittner |
| 4,032,867 A | 6/1977 | Engeler et al. |
| 4,223,831 A | 9/1980 | Szarka |

(Continued)

FOREIGN PATENT DOCUMENTS

| | | |
|---|---|---|
| CA | 2202008 | 10/1998 |
| EP | 0196069 | 10/1986 |

(Continued)

OTHER PUBLICATIONS

Akhlaghinia et al., "Occupancy Monitoring in Intelligent Environment Through Integrated Wireless Localizing Agents," In 2009 IEEE Symposium on intelligent Agents, Piscataway, NJ, USA, vol. 30, 7 pages, 2009.

(Continued)

*Primary Examiner* — Beverly M Flanagan
(74) *Attorney, Agent, or Firm* — Seager, Tufte & Wickhem, LLP

(57) ABSTRACT

A hybrid manual/programmable thermostat for a furnace or air conditioner offers the simplicity of a manual thermostat while providing the convenience and versatility of a programmable one. Initially, the hybrid thermostat appears to function as an ordinary manual thermostat; however, it privately observes and learns a user's manual temperature setting habits and eventually programs itself accordingly. If users begin changing their preferred temperature settings due to seasonal changes or other reasons, the thermostat continues learning and will adapt to those changes as well. For ease of use, the thermostat does not require an onscreen menu as a user interface. In some embodiments, the thermostat can effectively program itself for temperature settings that are set to occur at particular times daily or just on weekends, yet the user is not required to enter the time of day or the day of the week.

22 Claims, 3 Drawing Sheets

(51) Int. Cl.

| | |
|---|---|
| ***F24F 11/00*** | (2006.01) |
| *F24F 11/06* | (2006.01) |

(56) References Cited

U.S. PATENT DOCUMENTS

| | | | | |
|---|---|---|---|---|
| 4,316,577 | A | | 2/1982 | Adams et al. |
| 4,335,847 | A | * | 6/1982 | Levine ..... 236/46 R |
| 4,350,966 | A | | 9/1982 | Nelson |
| 4,408,711 | A | | 10/1983 | Levine |
| 4,467,178 | A | * | 8/1984 | Swindle ..... 392/449 |
| 4,469,274 | A | * | 9/1984 | Levine ..... 236/46 R |
| 4,531,064 | A | * | 7/1985 | Levine ..... 307/66 |
| 4,595,430 | A | | 6/1986 | Baker |
| 4,615,380 | A | | 10/1986 | Beckey |
| 4,621,336 | A | | 11/1986 | Brown |
| 4,669,654 | A | | 6/1987 | Levine et al. |
| 4,674,027 | A | | 6/1987 | Beckey |
| 4,685,614 | A | | 8/1987 | Levine |
| 4,751,961 | A | | 6/1988 | Levine et al. |
| 4,768,706 | A | | 9/1988 | Parfitt |
| 5,005,264 | A | | 4/1991 | Lynch |
| 5,005,365 | A | | 4/1991 | Lynch |
| 5,056,712 | A | * | 10/1991 | Enck ..... 236/20 R |
| 5,088,645 | A | * | 2/1992 | Bell ..... 236/46 R |
| 5,115,967 | A | * | 5/1992 | Wedekind ..... 236/46 R |
| 5,165,465 | A | * | 11/1992 | Kenet ..... 165/11.1 |
| 5,170,935 | A | * | 12/1992 | Federspiel et al. ..... 236/44 C |
| 5,192,020 | A | | 3/1993 | Shah |
| 5,192,874 | A | | 3/1993 | Adams |
| 5,211,332 | A | | 5/1993 | Adams |
| 5,224,649 | A | | 7/1993 | Brown |
| 5,238,184 | A | | 8/1993 | Adams |
| 5,240,178 | A | | 8/1993 | Dewolf et al. |
| 5,255,975 | A | | 10/1993 | Adams |
| 5,270,952 | A | | 12/1993 | Adams et al. |
| 5,294,047 | A | | 3/1994 | Schwer |
| 5,303,612 | A | | 4/1994 | Odom et al. |
| 5,361,983 | A | | 11/1994 | Bird |
| 5,395,042 | A | | 3/1995 | Riley et al. |
| 5,476,221 | A | | 12/1995 | Seymour et al. |
| 5,482,209 | A | | 1/1996 | Cochran et al. |
| 5,485,954 | A | | 1/1996 | Guy et al. |
| 5,499,196 | A | | 3/1996 | Pacheco |
| 5,555,927 | A | | 9/1996 | Shah |
| 5,603,451 | A | | 2/1997 | Helander et al. |
| 5,611,484 | A | | 3/1997 | Uhrich |
| 5,627,531 | A | | 5/1997 | Posso et al. |
| 5,673,850 | A | | 10/1997 | Uptegraph et al. |
| 5,690,277 | A | | 11/1997 | Flood |
| 5,720,176 | A | | 2/1998 | Manson et al. |
| 5,808,602 | A | | 9/1998 | Sellers et al. |
| 5,902,183 | A | | 5/1999 | D'Souza |
| 5,909,378 | A | | 6/1999 | De Milleville et al. |
| 5,931,378 | A | | 8/1999 | Schramm et al. |
| 5,943,917 | A | | 8/1999 | Truong et al. |
| 5,977,964 | A | | 11/1999 | Williams et al. |
| 6,062,482 | A | | 5/2000 | Gauthier et al. |
| 6,098,893 | A | | 8/2000 | Berglund et al. |
| 6,164,374 | A | | 12/2000 | Rhodes et al. |
| 6,206,295 | B1 | | 3/2001 | LaCoste |
| 6,209,794 | B1 | | 4/2001 | Webster et al. |
| 6,211,921 | B1 | | 4/2001 | Cherian et al. |
| 6,213,404 | B1 | | 4/2001 | Dushane et al. |
| 6,216,956 | B1 | | 4/2001 | Ehlers et al. |
| 6,222,191 | B1 | | 4/2001 | Myron et al. |
| 6,286,764 | B1 | | 9/2001 | Garvey et al. |
| 6,298,285 | B1 | | 10/2001 | Addink et al. |
| 6,349,883 | B1 | | 2/2002 | Simmons et al. |
| 6,351,693 | B1 | | 2/2002 | Monie et al. |
| 6,356,204 | B1 | | 3/2002 | Guindi et al. |
| 6,375,087 | B1 | | 4/2002 | Day et al. |
| 6,453,687 | B2 | | 9/2002 | Sharood et al. |
| 6,502,758 | B2 | | 1/2003 | Cottrell |
| 6,519,509 | B1 | | 2/2003 | Nierlich et al. |
| 6,636,197 | B1 | | 10/2003 | Goldenberg et al. |
| 6,641,055 | B1 | | 11/2003 | Tiernan |
| 6,644,557 | B1 | | 11/2003 | Jacobs |
| 6,645,066 | B2 | | 11/2003 | Gutta et al. |
| 6,726,112 | B1 | | 4/2004 | Ho |
| 6,741,158 | B2 | | 5/2004 | Engler et al. |
| 6,769,482 | B2 | | 8/2004 | Wagner et al. |
| 6,814,299 | B1 | | 11/2004 | Carey |
| 6,824,069 | B2 | | 11/2004 | Rosen |
| 6,851,621 | B1 | | 2/2005 | Wacker |
| D506,150 | S | | 6/2005 | Backlund et al. |
| D506,689 | S | | 6/2005 | Backlund et al. |
| 6,951,306 | B2 | | 10/2005 | DeLuca |
| 7,000,849 | B2 | | 2/2006 | Ashworth et al. |
| 7,014,336 | B1 | | 3/2006 | Ducharme et al. |
| 7,024,336 | B2 | | 4/2006 | Salsbury |
| 7,028,912 | B1 | | 4/2006 | Rosen |
| 7,035,805 | B1 | | 4/2006 | Miller |
| 7,055,759 | B2 | | 6/2006 | Wacker et al. |
| 7,083,109 | B2 | | 8/2006 | Pouchak |
| 7,108,194 | B1 | | 9/2006 | Hankins, II |
| 7,109,970 | B1 | | 9/2006 | Miller |
| 7,111,788 | B2 | | 9/2006 | Reponen |
| 7,114,554 | B2 | | 10/2006 | Bergman et al. |
| 7,117,129 | B1 | | 10/2006 | Bash et al. |
| 7,140,551 | B2 | | 11/2006 | de Pauw et al. |
| 7,141,748 | B2 | | 11/2006 | Tanaka et al. |
| 7,142,948 | B2 | | 11/2006 | Metz |
| 7,146,348 | B2 | | 12/2006 | Geib et al. |
| 7,152,806 | B1 | | 12/2006 | Rosen |
| 7,156,318 | B1 | | 1/2007 | Rosen |
| 7,159,789 | B2 | | 1/2007 | Schwendinger et al. |
| 7,159,790 | B2 | | 1/2007 | Schwendinger et al. |
| 7,181,317 | B2 | | 2/2007 | Amundson et al. |
| 7,222,494 | B2 | | 5/2007 | Peterson et al. |
| 7,222,800 | B2 | | 5/2007 | Wruck |
| 7,225,054 | B2 | | 5/2007 | Amundson et al. |
| 7,258,280 | B2 | | 8/2007 | Wolfson |
| 7,264,175 | B2 | | 9/2007 | Schwendinger et al. |
| 7,274,972 | B2 | | 9/2007 | Amundson et al. |
| 7,287,709 | B2 | | 10/2007 | Proffitt et al. |
| 7,299,996 | B2 | | 11/2007 | Garrett et al. |
| 7,302,642 | B2 | | 11/2007 | Smith et al. |
| 7,333,880 | B2 | | 2/2008 | Brewster et al. |
| 7,379,997 | B2 | | 5/2008 | Ehlers et al. |
| RE40,437 | E | | 7/2008 | Rosen |
| 7,434,742 | B2 | | 10/2008 | Mueller et al. |
| 7,451,937 | B2 | | 11/2008 | Flood et al. |
| 7,455,240 | B2 | | 11/2008 | Chapman, Jr. et al. |
| 7,469,550 | B2 | | 12/2008 | Chapman, Jr. et al. |
| 7,509,753 | B2 | | 3/2009 | Nicosia et al. |
| 7,552,030 | B2 | | 6/2009 | Guralnik et al. |
| 7,558,648 | B2 | | 7/2009 | Hoglund et al. |
| 7,584,899 | B2 | | 9/2009 | de Pauw et al. |
| 7,596,431 | B1 | | 9/2009 | Forman et al. |
| 7,600,694 | B2 | | 10/2009 | Helt et al. |
| 7,614,567 | B2 | | 11/2009 | Chapman, Jr. et al. |
| 7,624,931 | B2 | | 12/2009 | Chapman, Jr. et al. |
| 7,634,504 | B2 | | 12/2009 | Amundson |
| 7,641,126 | B2 | | 1/2010 | Schultz et al. |
| 7,643,908 | B2 | | 1/2010 | Quirino et al. |
| 7,644,869 | B2 | | 1/2010 | Hoglund et al. |
| 7,667,163 | B2 | | 2/2010 | Ashworth et al. |
| 7,693,582 | B2 | | 4/2010 | Bergman et al. |
| 7,702,424 | B2 | | 4/2010 | Cannon et al. |
| 7,703,694 | B2 | | 4/2010 | Mueller et al. |
| 7,778,734 | B2 | | 8/2010 | Oswald et al. |
| 7,784,291 | B2 | | 8/2010 | Butler et al. |
| 7,784,704 | B2 | | 8/2010 | Harter |
| 7,802,618 | B2 | | 9/2010 | Simon et al. |
| 7,845,576 | B2 | | 12/2010 | Siddaramanna et al. |
| 7,848,900 | B2 | | 12/2010 | Steinberg et al. |
| 7,854,389 | B2 | | 12/2010 | Ahmed |
| 7,904,830 | B2 | | 3/2011 | Hoglund et al. |
| 7,913,825 | B2 | | 3/2011 | Boyer |
| 7,949,615 | B2 | | 5/2011 | Ehlers et al. |
| 8,010,237 | B2 | | 8/2011 | Cheung et al. |
| 8,019,567 | B2 | | 9/2011 | Steinberg et al. |
| 8,042,048 | B2 | | 10/2011 | Wilson et al. |
| 8,063,775 | B2 | | 11/2011 | Reed et al. |

(56) References Cited

U.S. PATENT DOCUMENTS

| | | | |
|---|---|---|---|
| 8,078,330 | B2 | 12/2011 | Brickfield et al. |
| 8,090,477 | B1 | 1/2012 | Steinberg |
| 8,131,497 | B2 | 3/2012 | Steinberg et al. |
| 8,180,492 | B2 | 5/2012 | Steinberg |
| 8,219,250 | B2 | 7/2012 | Dempster et al. |
| 8,239,922 | B2 | 8/2012 | Sullivan et al. |
| 8,280,536 | B1 | 10/2012 | Fadell et al. |
| 8,442,695 | B2 | 5/2013 | Imes et al. |
| 8,452,457 | B2 | 5/2013 | Matsuoka et al. |
| 8,510,255 | B2 | 8/2013 | Fadell et al. |
| 2002/0005435 | A1 | 1/2002 | Cottrell |
| 2003/0034898 | A1 | 2/2003 | Shamoon et al. |
| 2003/0040842 | A1 | 2/2003 | Poth |
| 2003/0042320 | A1 | 3/2003 | Decker |
| 2004/0027271 | A1 | 2/2004 | Schuster et al. |
| 2004/0034484 | A1 | 2/2004 | Solomita, Jr. et al. |
| 2004/0055446 | A1 | 3/2004 | Robbin et al. |
| 2004/0149478 | A1 | 8/2004 | Staiger |
| 2004/0249479 | A1 | 12/2004 | Shorrock |
| 2004/0256472 | A1 | 12/2004 | DeLuca |
| 2004/0260427 | A1 | 12/2004 | Wimsatt |
| 2004/0262410 | A1 | 12/2004 | Hull |
| 2005/0040247 | A1 | 2/2005 | Pouchak |
| 2005/0119766 | A1 | 6/2005 | Amundson et al. |
| 2005/0128067 | A1 | 6/2005 | Zakrewski |
| 2005/0189429 | A1 | 9/2005 | Breeden |
| 2005/0204997 | A1 | 9/2005 | Fournier |
| 2005/0280421 | A1 | 12/2005 | Yomoda |
| 2006/0079983 | A1 | 4/2006 | Willis |
| 2006/0186214 | A1 | 8/2006 | Simon et al. |
| 2006/0196953 | A1 | 9/2006 | Simon et al. |
| 2007/0045430 | A1 | 3/2007 | Chapman et al. |
| 2007/0045433 | A1 | 3/2007 | Chapman et al. |
| 2007/0045444 | A1 | 3/2007 | Gray |
| 2007/0050732 | A1 | 3/2007 | Chapman |
| 2007/0057079 | A1 | 3/2007 | Stark |
| 2007/0158442 | A1 | 7/2007 | Chapman et al. |
| 2007/0158444 | A1 | 7/2007 | Naujok et al. |
| 2007/0173978 | A1 | 7/2007 | Fein |
| 2007/0225867 | A1 | 9/2007 | Moorer et al. |
| 2007/0227721 | A1 | 10/2007 | Springer et al. |
| 2007/0228183 | A1 | 10/2007 | Kennedy et al. |
| 2007/0241203 | A1 | 10/2007 | Wagner et al. |
| 2007/0257120 | A1 | 11/2007 | Chapman et al. |
| 2007/0278320 | A1 | 12/2007 | Lunacek et al. |
| 2008/0006709 | A1 | 1/2008 | Ashworth et al. |
| 2008/0015742 | A1 | 1/2008 | Kulyk et al. |
| 2008/0054082 | A1 | 3/2008 | Evans et al. |
| 2008/0191045 | A1 | 8/2008 | Harter |
| 2008/0219227 | A1 | 9/2008 | Michaelis |
| 2008/0223136 | A1 | 9/2008 | Yakabe et al. |
| 2008/0245480 | A1 | 10/2008 | Knight et al. |
| 2008/0290183 | A1 | 11/2008 | Laberge et al. |
| 2008/0317292 | A1 | 12/2008 | Baker et al. |
| 2009/0001180 | A1 | 1/2009 | Siddaramanna et al. |
| 2009/0057424 | A1 | 3/2009 | Sullivan et al. |
| 2009/0112335 | A1 | 4/2009 | Mehta et al. |
| 2009/0140056 | A1 | 6/2009 | Leen |
| 2009/0140057 | A1 | 6/2009 | Leen |
| 2009/0143916 | A1 | 6/2009 | Boll et al. |
| 2009/0171862 | A1 | 7/2009 | Harrod et al. |
| 2009/0195349 | A1 | 8/2009 | Frader-Thompson et al. |
| 2009/0215534 | A1 | 8/2009 | Wilson et al. |
| 2009/0216380 | A1 | 8/2009 | Kolk |
| 2009/0254225 | A1 | 10/2009 | Boucher et al. |
| 2009/0259713 | A1 | 10/2009 | Blumrich et al. |
| 2009/0271042 | A1 | 10/2009 | Voysey |
| 2009/0283603 | A1 | 11/2009 | Peterson et al. |
| 2009/0312999 | A1 | 12/2009 | Kasztenny et al. |
| 2010/0019051 | A1 | 1/2010 | Rosen |
| 2010/0025483 | A1* | 2/2010 | Hoeynck et al. ..... 236/1 C |
| 2010/0026229 | A1 | 2/2010 | Williams |
| 2010/0052576 | A1 | 3/2010 | Steiner et al. |
| 2010/0070084 | A1 | 3/2010 | Steinberg et al. |
| 2010/0070085 | A1 | 3/2010 | Harrod et al. |
| 2010/0070086 | A1 | 3/2010 | Harrod et al. |
| 2010/0070089 | A1 | 3/2010 | Harrod et al. |
| 2010/0070096 | A1 | 3/2010 | Rauscher et al. |
| 2010/0070234 | A1 | 3/2010 | Steinberg et al. |
| 2010/0070907 | A1 | 3/2010 | Harrod et al. |
| 2010/0084482 | A1 | 4/2010 | Kennedy et al. |
| 2010/0106305 | A1 | 4/2010 | Pavlak et al. |
| 2010/0107070 | A1 | 4/2010 | Devineni et al. |
| 2010/0107076 | A1 | 4/2010 | Grohman et al. |
| 2010/0198425 | A1 | 8/2010 | Donovan |
| 2010/0211224 | A1 | 8/2010 | Keeling et al. |
| 2010/0262298 | A1 | 10/2010 | Johnson et al. |
| 2010/0262299 | A1 | 10/2010 | Cheung et al. |
| 2010/0280667 | A1 | 11/2010 | Steinberg |
| 2010/0289643 | A1 | 11/2010 | Trundle et al. |
| 2010/0308119 | A1 | 12/2010 | Steinberg et al. |
| 2010/0318227 | A1 | 12/2010 | Steinberg et al. |
| 2010/0324437 | A1 | 12/2010 | Freeman et al. |
| 2010/0327766 | A1 | 12/2010 | Recker et al. |
| 2011/0015798 | A1 | 1/2011 | Golden et al. |
| 2011/0015802 | A1 | 1/2011 | Imes |
| 2011/0035060 | A1 | 2/2011 | Oswald |
| 2011/0046756 | A1 | 2/2011 | Park |
| 2011/0046782 | A1 | 2/2011 | Fixell |
| 2011/0046792 | A1 | 2/2011 | Imes et al. |
| 2011/0046805 | A1 | 2/2011 | Bedros et al. |
| 2011/0046806 | A1 | 2/2011 | Nagel et al. |
| 2011/0054710 | A1 | 3/2011 | Imes et al. |
| 2011/0077896 | A1 | 3/2011 | Steinberg et al. |
| 2011/0153089 | A1 | 6/2011 | Tiemann et al. |
| 2011/0173542 | A1 | 7/2011 | Imes et al. |
| 2011/0185895 | A1 | 8/2011 | Freen |
| 2011/0196539 | A1 | 8/2011 | Nair et al. |
| 2011/0224838 | A1 | 9/2011 | Imes et al. |
| 2011/0288905 | A1 | 11/2011 | Mrakas |
| 2011/0307103 | A1 | 12/2011 | Cheung et al. |
| 2012/0065935 | A1 | 3/2012 | Steinberg et al. |
| 2012/0066168 | A1 | 3/2012 | Fadell et al. |
| 2012/0085831 | A1 | 4/2012 | Kopp |
| 2012/0131504 | A1 | 5/2012 | Fadell et al. |
| 2012/0158350 | A1 | 6/2012 | Steinberg et al. |
| 2012/0165993 | A1 | 6/2012 | Whitehouse |
| 2012/0221151 | A1 | 8/2012 | Steinberg |
| 2012/0245740 | A1 | 9/2012 | Raestik et al. |
| 2013/0103622 | A1 | 4/2013 | Matsuoka et al. |
| 2013/0274928 | A1 | 10/2013 | Matsuoka et al. |

FOREIGN PATENT DOCUMENTS

| | | |
|---|---|---|
| JP | S59-106311 | 6/1984 |
| JP | H1-252850 | 10/1989 |
| WO | WO 2011072332 | 6/2011 |

OTHER PUBLICATIONS

Allen et al., "Real-Time Earthquake Detection and Hazard Assessment by Alarms Across California," Geophysical Research Letters, vol. 36, pp. 1-6, 2009.

Aprilaire Electronic Thermostats, "User's Manual Installation and Programming," Dec. 2000.

Bay Controls LLC. "Bayweb Thermostat Model BW-WT2 Owner's Manual," Revision 1.8, 31 pages. Nov. 2, 2011.

Braeburn, "Braeburn Premier Series Programmable Thermostats, Model 5200," 11 pages, 2011.

Braeburn, "Braeburn Premier Series Universal Auto Changeover Up to 3 Heat/2 Cool Heat Pump, or 2 Heat/2 Cool Conventional Thermostat, Model 5300, Installer Guide," 10 pages, 2009.

Braeburn, "Premier Series Programmable Thermostats," pp. 1-20, 2011.

Braeburn, "Premier Series Unversal Auto Changeover 5300," pp. 1-15, 2009.

California Energy Commision, "Buildings End-Use Energy Efficiency, Alternatives to Compressor Cooling," 80 pages, Jan. 2000.

Carrier, "TB-PAC TB-PHP Base Series Programmable Thermostats Installation Instructions," 8 pages, 2012.

(56) References Cited

OTHER PUBLICATIONS

Carrier, "SYSTXCCUIZ01-V Infinity Control Installation Instructions," pp. 1-20, 2012.
Cisco Systems, White Paper, "Wi-Fi Based Real-Time Location Tracking: Solutions and Technology," Cisco Systems, Inc., 6 pages, 2006.
Davis, "Buildings End-Use energy Efficiency; Alternatives to Compressor Cooling," California Energy Commission, 80 pages, Jan. 2000.
Deleeuw, "Ecobee WiFi enabled Smart Thermostat Part 2: The Features review," pp. 1-7, Dec. 2, 2011.
Ecobee, "Introducing the new Smart Si Thermostat," 4 pages, before 2013.
Ecobee, "Introducing the new Smart Si Thermostat," 7 pages, prior to Jul. 17, 2012.
Ecobee, "Smart Si Thermostat User Manual," EB-SmartSiUM-01rev1. 44 pages, 2012.
Ecobee, "Smart Thermostat User's Manual," UM-STAT-106-R4. 20 pages, 2010.
Ecobee, "Smart Thermostat," 6 pages, 2011.
Erickson, et al., "Energy Efficient Building Environment Control Strategies Using Real-Time Occupancy Measurement," ACM Workshop on Embedded Sensing Systems for Energy Efficiency in Buildings, pp. 19-24, 2009.
Fountain et al., "Comfort control for short-term occupancy," Center for the Built Environment, UC Berkeley, 15 pages, Publicized Jan. 14, 1994.
Goa et al., "The Self-Programming Thermostat: Optimizing Setback Schedules based on Home Occupancy Patterns," BuildSys -09, 6 pages, Nov. 3, 2009.
Honeywell, "CT8775A,C The Digital Round(TM) Non-Programmable thermostats," 69-1676-1. 20 pages, 2004.
Honeywell, "VisionPro TH8000 Series Touchscreen Programmable Thermostat," Operating Manual, 32 pages, 2011.
Honeywell, "Installation Guide VisionPRO TH8000 Series," 69-2693-01, pp. 1-11, 2012.
Honeywell, "Operating Manual FocusPRO TH6000 Series," 69-1921EFS-03, pp. 1-24, 2011.
Honeywell, "Perfect Climate Comfort Center control systems," 68-0173-3, pp. 1-44, 2001.
Honeywell, "Prestige Product Data," Honeywell International Inc., 126 pages, 2012.
Honeywell, "T8611G Chronotherm IV Deluxe Programmable Heat Pump Thermostat Installation Instructions," 69-1406-1, pp. 1-24, 1997.
Honeywell, "THX9321 Prestige 2.0 and THX9421 Prestige IAQ 2.0 with EIM," 68-0311-02, 160 pages, 2012.
http://ambientdevices.com/about/energy-devices, "Ambient Products," 2 pages, 2013.
http://ambientdevices-myshopify.com/products/energy-joule, "Ambient Devices—Energy Joule," 1 page, printed Dec. 4, 2013.
http://www.duurzaamthuis.nl/review-slimme-thermostat-icy, "Review Slimme Thermostat ICY," 5 pages, Feb. 17, 2011.
http://www.icy.nl/en/consumer/products/clever-thermostat-pro, "Clever Thermostat Pro—ICY," Overview, 1 page, printed Dec. 4, 2013.
http://www.icy.nl/en/consumerproducts/clever-thermostat, "The Clever Thermostat—ICY," Overview, 1 page, printed Dec. 4, 2013.
http://www.icy.nl/en/consumerproducts/clever-thermostat, "The Clever Thermostat—ICY," Features, 1 page, printed Dec. 4, 2013.
"ICY 18xx Timer-Thermostats," User Manual and Installation Guide, 1 page, 2009.
ICY, "ICY Timer Thermostat Connection to District Heating, Honeywell VC8015 en VC8615," 1 page, downloaded Dec. 4, 2013.
Lennox, "Homeowner's Manual ComfortSense 5000 Series," 32 pages, Feb. 2008.
Lennox, "Homeowner's Manual ComfortSense 7000 Series," 506229-01, pp. 1-15, May 2009.
Lennox, "Homeowner's Manual icomfort Touch Thermostat," 506053-01, pp. 1-20, Dec. 2010.
Lennox, "Owner's Guide, ComfortSense 5000 Series Models L5711U and L5732U Programmable Touch Screen Thermostats," p. 1-32, Feb. 2008. 506067-01.
Lu et al., "The Smart Thermostat: Using Occupancy Sensors to Save Energy in Homes," 14 pages, SenSys '10, Nov. 3-5, 2010.
LuxPro, "Instruction Manual LuxPro PSPU732T." PSPU732T Manual, 48 pages, Before 2013.
Melfi et al., "Measuring Building Occupancy Using Existing Network Infrastructure," Green Computing Conference and Workshops (IGCC) International, IEEE, pp. 1-8, 2011.
Mozer et al., "The Neurothermostat: Predictive Optimal Control of Residential Heating Systems," Adv. In Neural Info. Proc. Systems 9, pp. 953-959, 1997.
Mozer, "Lessons from an Adaptive House," University of Colorado Department of Computer Science. http://www.cs.colorado.edu/~mozer/adaptive-house, 58 pages, downloaded Nov. 7, 2011.
Mozer, "The Neural Network House: An Environment that Adapts to its Inhabitants," University of Colorado Department of Computer Science. AAA1, Technical Report SS98-02-017, pp. 110-114, 1998.
"Nest Learning Thermostat Efficiency Simulation White Paper," 22 pages, Oct. 21, 2011.
Network Thermostat, "Network Thermostat RP32 Universal Programmable Communicating Thermostat," Installation and Programming Instructions, 6 pages, downloaded Dec. 5, 2013.
Network Thermostat, "Network Thermostat RP32-WiFi, Wi-Fi Thermostat," 2 pages, 2012.
Network Thermostat, "Nex/X WiFi Thermostat," 3 pages, 2012.
Nordman et al., "Using Existing Networks for Energy Purposes," Proceedings of the First ACM Workshop on Embedded Sensing Systems for Energy-Efficiency in Buildings, 2 pages, 2009.
"Quad Six Magic-Stat(R) Thermostat MS2000 Manual 88-610M_0_001986," 090051B 88610M. 40 pages, 1986.
Robertshaw, "9620 Digital Programmable Thermostat User's Manual," 110-732E, pp. 1-14, 2001.
Robertshaw, "9801i2, 9825i2 Deluxe Programmable Thermostats," pp. 1-36, Jul. 17, 2006.
Scott et al., "PreHeat: Controlling Home Heating Using Occupancy Prediction," Proceedings of the 13th International Conference on Ubiquitous Computing, pp. 281-291, ACM, 2011.
Trane, "ComfortLink II Installation Guide", pp. 1-20, Mar. 2011.
Trane, "TCONT600AF11MA Programmable Comfort Control, Installation Instructions," Pub. No. 18-HD25D20-3. pp. 1-14, 2006.
Trane, "Trane communicating Thermostats for Fan Coil Control, User Guide," BAS-SVU12A-EN, pp. 1-32, May 2011.
Trane, "Trane communicating Thermostats for Heat Pump Control," BAS-SVU10A-EN, pp. 1-32, May 2011.
Venstar, "Commercial Thermostats T2900, Owner's Manual," pp. 1-26.2, Apr. 2008.
Venstar, "Residential Thermostat T5800 Owner's Manual and Installation Instructions", Revision 5b, 63 pages, before 2013. P/N88-860.
VisionPRO TH8000 Series Installation Guide, Honeywell International Inc., 12 pages, 2012.
VisionPRO Wi-Fi Programmable Thermostat Model TH8320WF, Honeywell International Inc., 48 pages, 2012.
Washington State University Extension Energy Program, "Electric Heat Lock Out on Heat Pumps," pp. 1-3, Apr. 2010.
White Rodgers Model 1F81-261 Installation and Operating Instructions, White-Rodgers, Emerson Electric Co., 8 pages, 2010.
White Rodgers, "Emerson Blue Wireless Comfort Interface 1F98EZ-1621," Emerson Climate Technologies, 28 pages, before 2013. Part No. 37-7236-A.
Extended European Search Report for EP 14795422, Mar. 18, 2016.

* cited by examiner

SELF-PROGRAMMABLE THERMOSTAT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 7,784,704, which is hereby incorporated by reference in its entirety. The reissue applications are application Ser. Nos. 13/551,543 (the parent reissue application, which is incorporated herein by reference in its entirety) and 14/714,535 (the present reissue application).*

*This application is a reissue continuation of application Ser. No. 13/551,543, now U.S. Pat. No. Re. 45,574, which is an application for reissue of U.S. Pat. No. 7,784,704.*

FIELD OF THE INVENTION

The subject invention generally pertains to a room or building thermostat and more specifically to a method of programming such a thermostat, wherein the thermostat can in effect program itself for various daily and/or weekly temperature setpoints upon learning temperature setting habits of a user and can do such self-programming without ever knowing the actual time of day or day of the week.

BACKGROUND OF RELATED ART

Furnaces, air conditioners and other types of temperature conditioning units typically respond to a thermostat in controlling the air temperature of a room or other area of a building. Currently, thermostats can be classified as manual or programmable.

With manual thermostats, a user manually enters into the thermostat a desired temperature setpoint, and then thermostat controls the temperature conditioning unit to bring the actual room temperature to that setpoint. At various times throughout the day, the user might adjust the setpoint for comfort or to save energy. When operating in a heating mode, for instance, a user might lower the setpoint temperature at night and raise it again in the morning. Although manual thermostats are easy to understand and use, having to repeatedly adjust the setpoint manually can be a nuisance.

Programmable thermostats, on the other hand, can be programmed to automatically adjust the setpoint to predetermined temperatures at specified times. The specified times can initiate automatic setpoint adjustments that occur daily such as on Monday-Friday, or the adjustments might occur weekly on days such as every Saturday or Sunday. For a given day, programmable thermostats can also be programmed to make multiple setpoint adjustments throughout the day, such as at 8:00 AM and 11:00 PM on Saturday or at 6:00 AM and 10 PM on Monday through Friday. Such programming, however, can be confusing as it can involve several steps including: 1) synchronizing the thermostat's clock with the current time of day; 2) entering into the thermostat the current date or day of the week; and 3) entering various chosen days, times and setpoint temperatures. One or more of these steps may need to be repeated in the event of daylight savings time, electrical power interruption, change in user preferences, and various other reasons.

Consequently, there is a need for a thermostat that offers the simplicity of a manual thermostat while providing the convenience and versatility of a programmed thermostat.

SUMMARY OF THE INVENTION

An object of the invention is to provide an essentially self-programmable thermostat for people that do not enjoy programming conventional programmable thermostats.

An object of some embodiments of the invention is to provide a programmable thermostat that does not rely on having to know the time of day, thus a user does not have to enter that.

Another object of some embodiments is to provide a programmable thermostat with both daily and weekly occurring settings, yet the thermostat does not rely on having to know the day of the week, thus a user does not have to enter that.

Another object of some embodiments is to provide a programmable thermostat that does not rely on onscreen menus for programming.

Another object of some embodiments is to provide a thermostat that effectively programs itself as it is being used as a manual thermostat.

Another object of some embodiments is to provide a thermostat that automatically switches from a manual mode to a programmed mode when it recognizes an opportunity to do so.

Another object of some embodiments is to provide a thermostat that automatically switches from a programmed mode to a manual mode simply by manually entering a new desired setpoint temperature.

Another object of some embodiments is to observe and learn the temperature setting habits of a user and automatically program a thermostat accordingly.

Another object of some embodiments is to provide a self-programming thermostat that not only learns a user's temperature setting habits, but if those habits or temperature-setting preferences change over time, the thermostat continues learning and will adapt to the new habits and setpoints as well.

Another object of some embodiments is to minimize the number of inputs and actions from which a user can choose, thereby simplifying the use of a thermostat.

Another object of some embodiments is to provide a thermostat that can effectively self-program virtually an infinite number of setpoint temperatures and times, rather than be limited to a select few number of preprogrammed settings.

Another object of some embodiments is to provide a simple way of clearing programmed settings of a thermostat.

One or more of these and/or other objects of the invention are provided by a thermostat and method that learns the manual temperature setting habits of a user and programs itself accordingly.

DESCRIPTION OF THE PREFERRED EMBODIMENT

Figure 1:
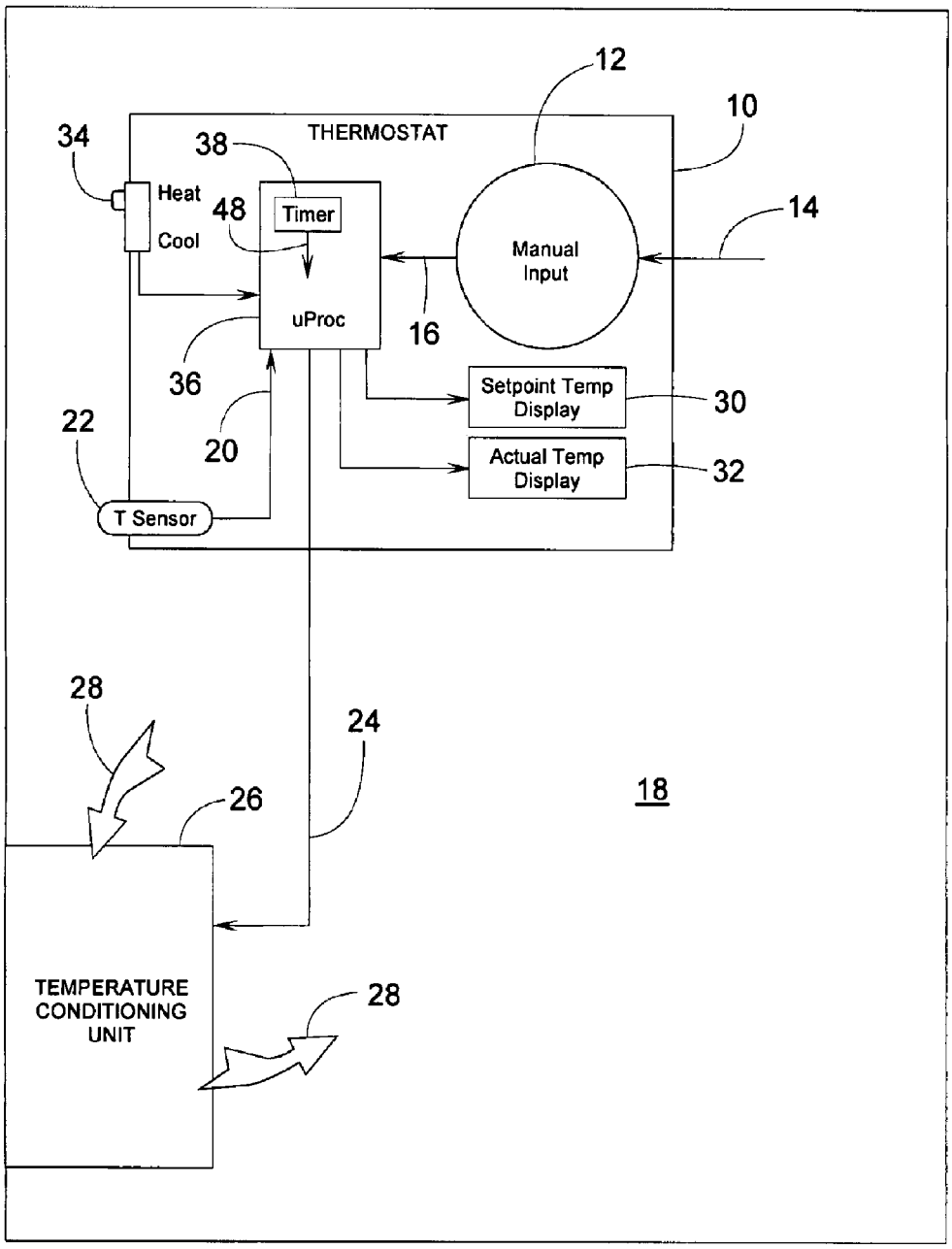
FIG. 1 is a schematic view of a thermostat controlling a temperature conditioning unit.
Figure 2:
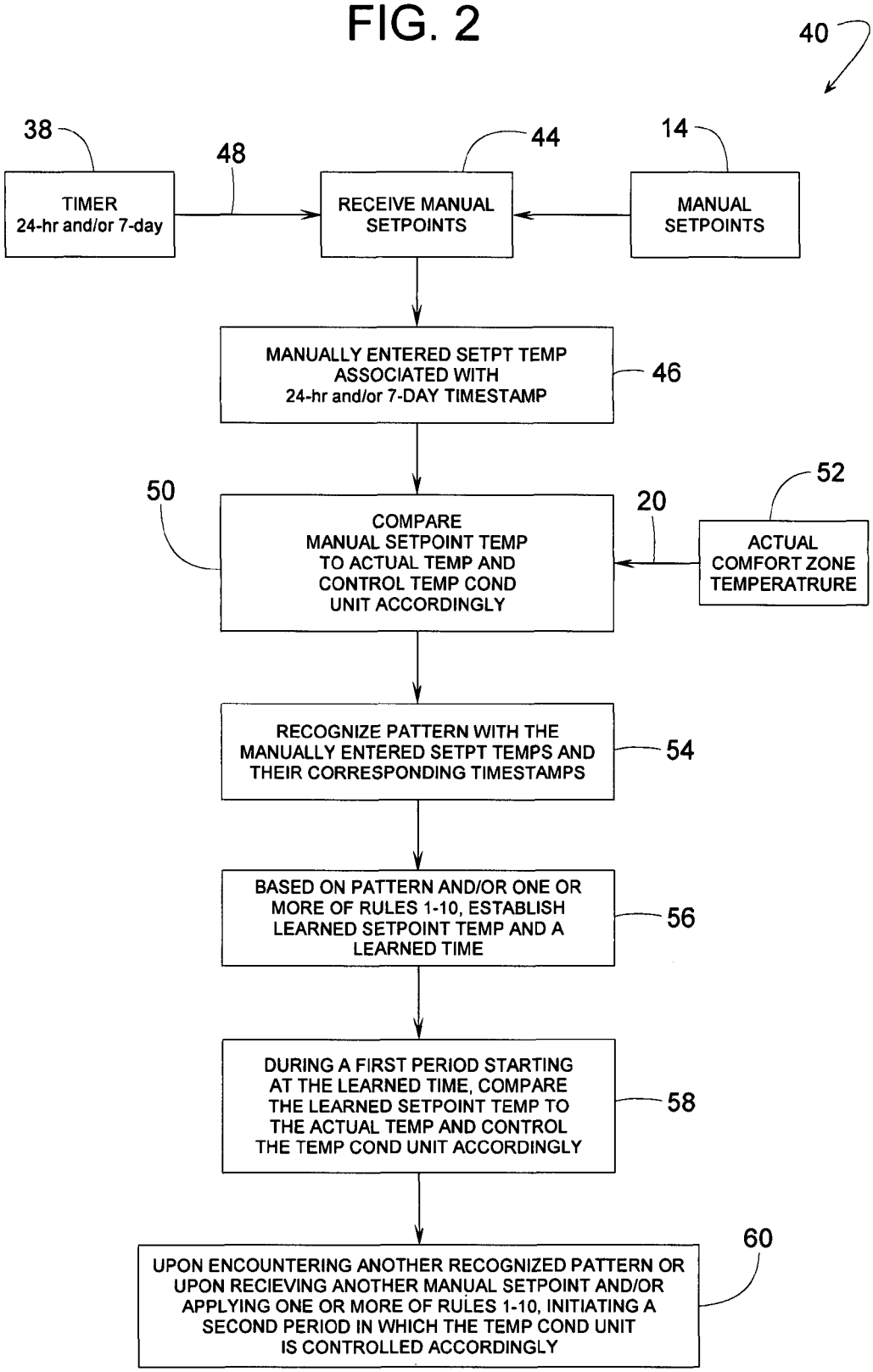
FIG. 2 shows an example of algorithm for a thermostat method.
Figure 3:
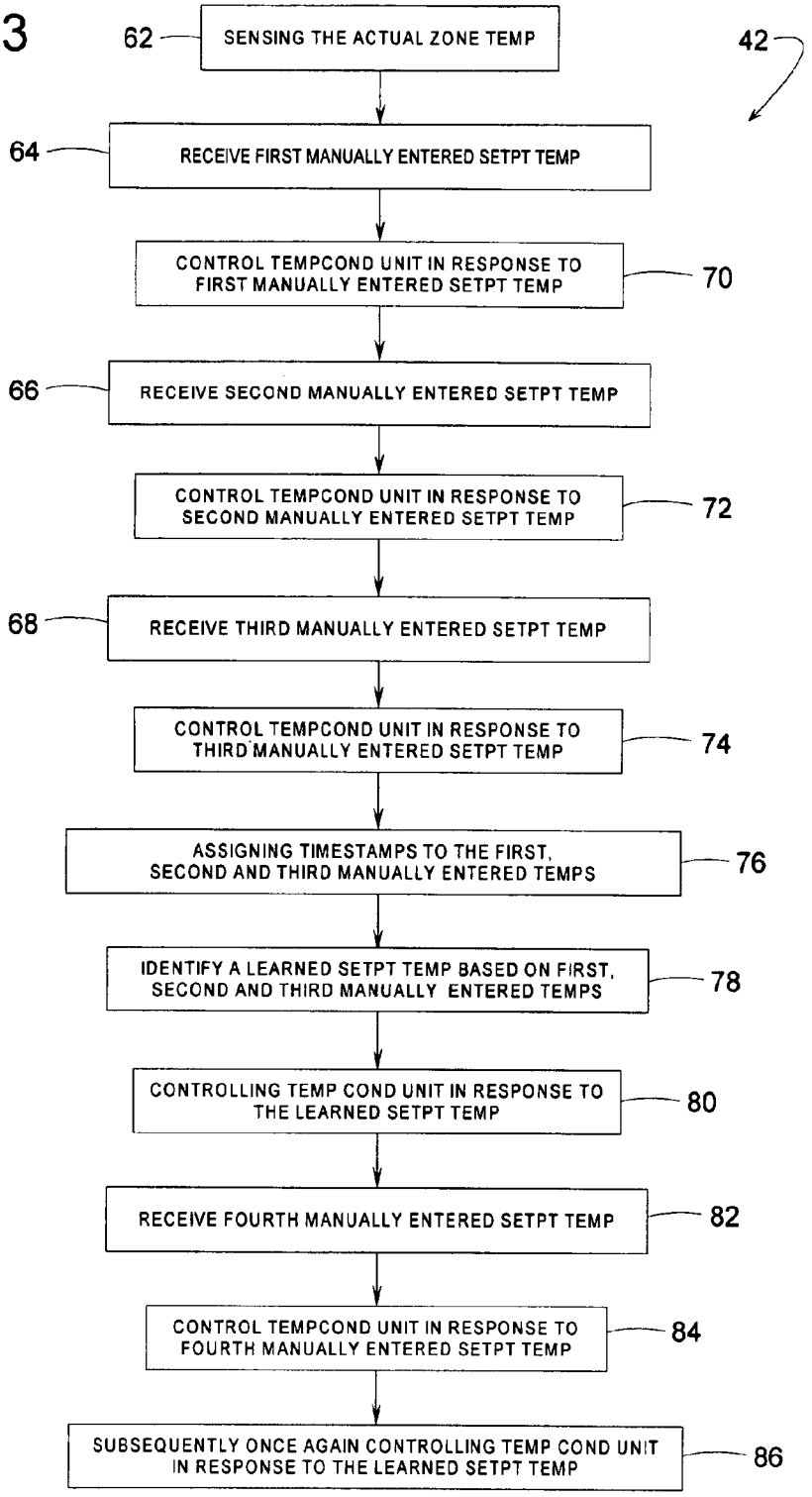
FIG. 3 shows another example of algorithm for a thermostat method.

FIGS. 1-3 show a thermostat 10 and a method for automatically programming it. Initially, thermostat 10 might first appear and function as an ordinary manual thermostat. Thermostat 10, for instance, includes a manual input 12 (e.g., dial, keyboard, pointer, slider, potentiometer, pushbutton, etc.) that enables a user to manually enter a manual setpoint 14 that defines a manually entered setpoint temperature 16. The manually entered setpoint temperature 16 is the user's desired target temperature for a comfort zone 18. Upon comparing the manually entered setpoint temperature 16 to the comfort zone's actual temperature 20 (provided by a temperature sensor 22), thermostat 10 provides an output signal 24 that controls a temperature conditioning unit 26 (e.g., furnace, heater, air conditioner, heat pump, etc.) to heat or cool air 28 in comfort zone 18, thereby urging the comfort zone's actual temperature 20 toward the manually entered setpoint temperature 16.

A digital display 30 can be used for displaying the current setpoint temperature, and another display 32 can show the comfort zone's actual temperature. Displays 30 and 32 could be combined into a single display unit, wherein the combined display unit could show the current setpoint temperature and the zone's actual temperature simultaneously or in an alternating manner. Thermostat 10 might also include a selector switch 34 for manually switching between a cooling mode for cooling zone 18 and a heating mode for heating zone 18. Items such as display 30, selector switch 34, manual input 12, and output 24 are well known to those of ordinary skill in the art. One or more of such items, for example, can be found in a model CT8775C manual thermostat provided by Honeywell Inc. of Golden Valley, Minn.

Although thermostat 10 can operate as a regular manual thermostat by controlling unit 26 as a function of a differential between the actual zone temperature and the most recently entered manual setpoint temperature, thermostat 10 includes a microprocessor 36 (e.g., computer, CPU, firmware programmed chip, etc.) that enables thermostat 10 to observe the temperature setting habits of the user (e.g., person that manually enters setpoint temperatures into the thermostat). After several manual settings, microprocessor 36 may learn the user's preferred setpoint temperatures and timestamps them with the aide of a timer 38. With one or more learned setpoint temperatures and timestamps 48, microprocessor 36 can begin anticipating the user's desires and automatically adjust the thermostat's setpoint temperatures accordingly. Thus, thermostat 10 can begin operating as a programmed thermostat, rather than just a manual one.

Since a user's desired temperature setpoints and time preferences might change for various reasons, any manually entered setpoint temperature 16 overrides the currently active setpoint temperature regardless of whether the current setpoint temperature was manually entered or was automatically activated as a learned setpoint temperature. Once overridden, another learned setpoint temperature might later be activated at a learned time to return thermostat 10 back to its programmed mode. Thus, thermostat 10 is somewhat of a hybrid manual/programmable thermostat in that it can shift automatically between manual and programmed operation.

To assign timestamps 48 to manually entered setpoint temperatures, timer 38 can actually comprise one or more timers and/or counters. In some embodiments, for example, timer 38 includes a continuously running daily or 24-hour timer that resets itself every 24 hours. The time increments can be in minutes, seconds, or any preferred unit. In some cases, timer 38 is a continuously operating weekly or 168-hour timer that resets itself every seven days. The increments can be in days, hours, minutes, seconds, or any preferred unit. The weekly timer could also be a seven-increment counter that indexes one increment every 24 hours in response to a daily or 24-hour timer. Timer 38, however, is not necessarily synchronized with the actual time of day or day of the week. Such synchronization preferably is not required; otherwise the user might have to manually enter or set the correct time and day of the week.

In the case where timer 36 comprises a weekly timer in the form of a 7-increment counter triggered by each 24-hour cycle of a daily timer, timestamp 48 might a be a two-part number such as (X and Y) wherein X cycles from 1 to 7 as a weekly timer, and Y cycles from 0 to 1,439 (1,440 minutes per day) as a daily timer. In this case, a timestamp 48 might be (3 and 700) to indicate 700 minutes elapsed during day-3. Whether day-3 represents Monday, Tuesday or some other day is immaterial, and whether the 700-minute represents 2:00 AM, 7:30 PM or some other time of day is also immaterial. As one way to provide a programmable thermostat that can operate independently of an actual time of day clock and to provide thermostat 10 with other functionality, microprocessor 36 can be firmware programmed to execute one or more of the following rules:

Rule-1—Upon receiving a manually entered setpoint temperature, microprocessor assigns an (X and Y) timestamp 48 to the manually entered setpoint temperature, wherein the timestamp indicates when the setpoint temperature was entered relative to other timestamps. The manually entered setpoint temperature and its timestamp 48 are stored in memory for later reference.

Rule-2—Microprocessor 36 looks for patterns of manual setpoints, wherein each manual setpoint has a manually entered setpoint temperature and a timestamp 48.

A daily pattern, for example, can be defined as three consecutive days in which a series of three similar manually entered setpoint temperatures (e.g., within a predetermined deviation of perhaps 2° F. or 5° F. of each other) have similar daily timestamps 48 (e.g., each Y-value being within a predetermined deviation of perhaps 90 minutes of each other). Such a daily pattern can then be assigned a learned daily setpoint temperature and a learned daily time. The learned daily setpoint temperature could be, for example, an average of the three similar manually entered setpoints temperatures or the most recent of the three. The learned daily time could be, for example, 20 minutes before the three similar timestamps. For future automatic settings, the 20 minutes might allow microprocessor 36 to activate the learned daily setpoint temperature before the user would normally want to adjust the setpoint.

A weekly pattern, for example, can be defined as three manual setpoints spaced 7 days apart (e.g., same X-value after one complete 7-day cycle) in which three similar manually entered setpoint temperatures (e.g., within 2° F. or 5° F. of each other) have similar timestamps 48 (e.g., each Y-value being within 90 minutes of each other). Such a weekly pattern can then be assigned a learned weekly setpoint temperature and a learned weekly time. The learned weekly setpoint temperature could be, for example, an average of the three similar manually entered setpoints temperatures spaced 7 days apart or the most recent of the three. The learned time could be, for example, 20 minutes before the three similar timestamps.

Rule-3—Automatically activate a learned daily setpoint temperature at its learned daily time (at its assigned Y-value), whereby thermostat 10 controls unit 26 based on the learned daily setpoint temperature and continues to do so until interrupted by one of the following: a) the user enters a manually entered setpoint temperature (adjusts the temp), b) another learned daily setpoint temperature becomes activated at its learned daily time, or c) a learned weekly setpoint temperature becomes activated at its learned weekly time.

Rule-4—Automatically activate a learned weekly setpoint temperature at its learned weekly time (at its assigned X and Y values), whereby thermostat 10 controls unit 26 based on the learned weekly setpoint temperature and continues to do so until interrupted by one of the following: a) the user enters a manually entered setpoint temperature (adjusts the temp), b) a learned daily setpoint temperature becomes activated at its learned daily time (but see Rule-5), or c) another learned weekly setpoint temperature becomes activated at its learned weekly time.

Rule-5—A weekly pattern overrides or supersedes a daily pattern if their assigned timestamps 48 are within a predetermined period of each other such as, for example, within three hours of each other based on the Y-values of their timestamps.

Rule-6—If a user enters a manually entered setpoint temperature, thermostat 10 controls unit 26 in response to the manually entered setpoint temperature and continues to do so until interrupted by one of the following: a) the user enters another manually entered setpoint temperature (adjusts the temp), b) a learned daily setpoint temperature becomes activated at its learned daily time, or c) a learned weekly setpoint temperature becomes activated at its learned weekly time.

Rule-7—If a user enters two manually entered setpoint temperatures within a predetermined short period of each other, e.g., within 90 minutes of each other, the first of the two manual entries is disregarded as being erroneous and is not to be considered as part of any learned pattern.

Rule-8—If a learned daily setpoint temperature is activated at a learned time and is soon interrupted by the user entering a manually entered setpoint temperature within a predetermined short period (e.g., within 3 hours), and this occurs a predetermined number of days in a row (e.g., 3 days in a row as indicated by the X-value of timer 38), then the daily pattern associated with the learned daily setpoint temperature is erased from the memory.

Rule-9—If a learned weekly setpoint temperature is activated at a learned time and is soon interrupted by the user entering a manually entered setpoint temperature within a predetermined short period (e.g., within 3 hours), and this occurs a predetermined number of weeks in a row (e.g., 2 weeks in a row as indicated by an additional counter that counts the cycles of the X-value of timer 38), then the weekly pattern associated with the learned weekly setpoint temperature is erased from the memory.

Rule-10—Actuating switch 34 between cool and heat or actuating some other manual input can be used for erasing the entire collection of learned data.

Rules 1-10 might be summarized more concisely but perhaps less accurately as follows:

1) Assign timestamps 48 to every manually entered setpoint temperature.

2) Identify daily patterns (similar manually entered temperatures and times 3 days in a row), and identify weekly patterns (3 similar manually entered temperatures and times each spaced a week apart). Based on those patterns, establish learned setpoint temperatures and learned times.

3) Activate learned daily setpoints at learned times, and keep them active until the activated setpoint is overridden by the next learned setpoint or interrupted by a manually entered setpoint.

4) Activate learned weekly setpoints at learned times, and keep them active until the activated setpoint is overridden by the next learned setpoint or interrupted by a manually entered setpoint.

5) If a learned weekly setpoint and a learned daily setpoint are set to occur near the same time on given day, the learned daily setpoint is ignored on that day because the day is probably a Saturday or Sunday.

6) Whenever the user manually adjusts the temperature, the manually entered setpoint temperature always overrides the currently active setting. The manually entered setpoint remains active until it is interrupted by a subsequent manual or learned setting.

7) If a user repeatedly tweaks or adjusts the temperature within a short period, only the last manually entered setpoint temperature is used for learning purposes, as the other settings are assumed to be trial-and-error mistakes by the user.

8) If a user has to repeatedly correct a learned daily setpoint (e.g., correct it 3 days in a row), that learned setpoint is deleted and no longer used. Using 3 days as the cutoff avoids deleting a good daily pattern due to 2 days of corrections over a weekend.

9) If a user has to repeatedly correct a learned weekly setpoint (e.g., correct it 2 weeks in a row), that learned setpoint is deleted and no longer used.

10) Switching between heating and cooling, for at least 5 seconds or so, deletes the entire collection of learned data.

To execute one or more of the aforementioned rules, microprocessor 36 could operate under the control of various algorithms, such as, for example, an algorithm 40 of FIG. 2, an algorithm 42 of FIG. 3, a combination of algorithms 40 and 42, or another algorithm altogether.

Referring to the example of FIG. 2, a block 44 represents receiving a plurality of manual setpoints 14 that are manually entered at various points in time over a period, each of the manual setpoints 14 provides a manually entered setpoint temperature 16 that in block 46 becomes associated with a timestamp 48 via timer 38. Timer 38 can run independently or irrespective of the actual time of day and irrespective of the actual day of the week. In blocks 50 and 52, thermostat 10 controls unit 26 as a function of a differential between the actual zone temperature 20 and a currently active manually entered setpoint. In block 54, microprocessor 36 recognizes patterns with the manually entered setpoints. Based on the patterns, in block 56 microprocessor 10 establishes learned setpoint temperatures and corresponding learned times. In block 58, some time after controlling unit 26 in response to the manually entered setpoint temperatures (block 50), automatically switching at the learned time to controlling the temperature conditioning unit in response to the learned setpoint temperature. This might continue until interrupted by block 60, wherein microprocessor 36 encounters another recognized pattern or upon receiving another manual setpoint, at which point unit 26 is controlled in response thereto.

Referring to the example of FIG. 3, a block 62 represents microprocessor 36 receiving temperature feedback signal 20 from temperature sensor 22. Sensor 22 could be incorporated within thermostat 10, as shown in FIG. 1, or sensor 22 could be installed at some other location to sense the room temperature such as the temperature of air 28 entering unit 26. Blocks 64, 66 and 68 represent microprocessor 36 sequentially receiving first, second and third manually entered setpoint temperatures. Blocks 70, 72 and 74 represent thermostat 10 controlling unit 26 at sequential periods in response to a differential between the comfort zone temperature and the various manually entered setpoint temperatures. Block 76 represents assigning timestamps 48 to the various manually entered setpoint temperatures. A block 78 represents microprocessor 36 identifying a learned setpoint temperature based on the first, second and third manually entered setpoint temperatures. In block 80, thermostat 10 controls unit 26 in response to a differential between the learned setpoint temperature and the actual zone temperature. Block 82 represents subsequently receiving a fourth manually entered setpoint temperature. Block 84 represents controlling unit 26 in response to the fourth manually entered setpoint temperature. Some time after that, thermostat 10 returns to controlling unit 26 in response to the learned setpoint temperature, as indicated by block 86.

Although the invention is described with respect to a preferred embodiment, modifications thereto will be apparent to those of ordinary skill in the art. The scope of the invention, therefore, is to be determined by reference to the following claims:

The invention claimed is:

[1. A thermostat method for a temperature conditioning unit, wherein the temperature conditioning unit helps control a temperature of a comfort zone, the method comprising:

receiving a first manually entered setpoint temperature, which is assigned a first timestamp;

controlling the temperature conditioning unit in response to the first manually entered setpoint temperature;

receiving a second manually entered setpoint temperature, which is assigned a second timestamp;

controlling the temperature conditioning unit in response to the second manually entered setpoint temperature;

receiving a third manually entered setpoint temperature, which is assigned a third timestamp;

controlling the temperature conditioning unit in response to the third manually entered setpoint temperature;

identifying a learned setpoint temperature based on the first manually entered setpoint temperature, the second manually entered setpoint temperature, and third manually entered setpoint temperature; and controlling the temperature conditioning unit in response to the learned setpoint temperature; and wherein the first timestamp, the second timestamp, and the third timestamp are based on a 24-hour timer and all lie within a predetermined range of each other based on the 24-hour timer.]

[2. The thermostat method of claim 1, wherein first manually entered setpoint temperature, the second manually entered setpoint temperature, and third manually entered setpoint temperature all lie within 5° F. of each other.]

[3. The thermostat method of claim 1, further comprising:

after controlling the temperature conditioning unit in response to the learned setpoint temperature, receiving a fourth manually entered setpoint temperature; and after receiving the fourth manually entered setpoint temperature, controlling the temperature conditioning unit in response to the fourth manually entered setpoint temperature.]

[4. The thermostat method of claim 3, further comprising:

after controlling the temperature conditioning unit in response to the fourth manually entered setpoint temperature, returning to controlling the temperature conditioning unit in response to the learned setpoint temperature.]

[5. A thermostat method for a temperature conditioning unit, wherein the temperature conditioning unit helps control a temperature of a comfort zone, the method comprising:

receiving a first manually entered setpoint temperature, which is assigned a first timestamp;

controlling the temperature conditioning unit in response to the first manually entered setpoint temperature;

receiving a second manually entered setpoint temperature, which is assigned a second timestamp;

controlling the temperature conditioning unit in response to the second manually entered setpoint temperature;

receiving a third manually entered setpoint temperature, which is assigned a third timestamp;

controlling the temperature conditioning unit in response to the third manually entered setpoint temperature;

identifying a learned setpoint temperature based on the first manually entered setpoint temperature, the second manually entered setpoint temperature, and third manually entered setpoint temperature; and controlling the temperature conditioning unit in response to the learned setpoint temperature; and wherein the first timestamp, the second timestamp, and the third timestamp are based on a 168-hour timer.]

*6. A method for controlling a temperature conditioning unit of a building, comprising:*

*receiving via a user interface a plurality of desired setpoints, wherein each desired setpoint comprises a temperature value and a time value;*

*establishing a learned setpoint schedule based on the plurality of desired setpoints, the learned setpoint schedule comprises a plurality of discrete setpoints, wherein each discrete setpoint comprises a temperature value and a time value;*

*providing control signals for controlling the temperature conditioning unit in accordance with the learned setpoint schedule;*

*receiving via the user interface a subsequent desired setpoint while providing control signals for controlling the temperature conditioning unit in accordance with the learned setpoint schedule; and*

*automatically updating the learned setpoint schedule based, at least in part, on the subsequent desired setpoint.*

*7. The method of claim 6, further comprising receiving via the user interface a plurality of subsequent desired setpoint, and wherein the learned setpoint schedule is automatically updated after the plurality of subsequent desired setpoints are received.*

*8. The method of claim 6, further comprising receiving via the user interface a plurality of subsequent desired setpoint, and wherein automatically updating the learned setpoint schedule includes reducing two or more of the plurality of subsequent desired setpoints to a single discrete setpoint of the learned setpoint schedule.*

*9. The method of claim 6, wherein the subsequent desired setpoint includes a subsequent desired setpoint temperature, and wherein in response to receiving the subsequent desired setpoint, automatically switching to control the temperature conditioning unit in accordance with the subsequent desired setpoint temperature for at least a period time.*

*10. The method of claim 9, wherein in response to receiving the subsequent desired setpoint, automatically switching to control the temperature conditioning unit in accordance with the subsequent desired setpoint temperature until a next scheduled discrete setpoint of the learned setpoint schedule, and then automatically controlling the temperature conditioning unit in accordance with the next scheduled discrete setpoint of the learned setpoint schedule.*

*11. The method of claim 6, wherein the subsequent desired setpoint includes a subsequent desired setpoint temperature,*

*and wherein in response to receiving the subsequent desired setpoint, controlling the temperature conditioning unit in accordance with the subsequent desired setpoint temperature until another subsequent desired setpoint is received.*

*12. The method of claim 6, wherein the subsequent desired setpoint includes a subsequent desired setpoint temperature, and wherein in response to receiving the subsequent desired setpoint, automatically switching to control the temperature conditioning unit in accordance with the subsequent desired setpoint temperature until: (1) a next scheduled discrete setpoint of the learned setpoint schedule; or (2) another subsequent desired setpoint is received.*

*13. The method of claim 6, wherein establishing the learned setpoint schedule comprises recognizing a pattern in two or more of the plurality of desired setpoints.*

*14. The method of claim 6, wherein automatically updating the learned setpoint schedule comprises recognizing a pattern based, at least in part, on: (1) one or more of the plurality of desired setpoints and the subsequent desired setpoint; (2) one or more of the plurality of discrete setpoints of the learned setpoint schedule and the subsequent desired setpoint; or (3) the subsequent desired setpoint and at least one other subsequent desired setpoint.*

*15. The method of claim 6, wherein the user interface comprises a rotatable ring, and receiving the subsequent desired setpoint comprises rotating the rotatable ring.*

*16. The method of claim 6, wherein the subsequent desired setpoint is received without first manually activating a learn mode switch to enter a learning mode.*

*17. A method for controlling a temperature conditioning unit of a building, comprising:*

*storing a learned setpoint schedule comprising a plurality of learned desired setpoints;*

*controlling the temperature conditioning unit in accordance with the learned setpoint schedule;*

*while controlling the temperature conditioning unit in accordance with the learned setpoint schedule, receiving via a user interface a subsequent desired setpoint; and*

*automatically updating the learned setpoint schedule based, at least in part, on the subsequent desired setpoint.*

*18. The method of claim 17, wherein the subsequent desired setpoint is received without first manually activating a learn mode switch to enter a learning mode.*

*19. The method of claim 17, wherein the user interface comprises a rotatable ring, and wherein receiving the subsequent desired setpoint comprises rotating the rotatable ring.*

*20. The method of claim 17, wherein automatically updating the learned setpoint schedule comprises recognizing a pattern based, at least in part, on the subsequent desired setpoint.*

*21. The method of claim 17, wherein automatically updating the learned setpoint schedule comprises reducing at least the subsequent desired setpoint and one or more of the plurality of learned desired setpoints to a single discrete setpoint of the learned setpoint schedule.*

*22. A method for controlling a temperature conditioning unit of a building, comprising:*

*storing a learned setpoint schedule comprising a plurality of learned desired setpoints;*

*receiving via a user interface a plurality of desired setpoints, wherein each desired setpoint comprises a temperature value and a time value, and after receiving each of the plurality of desired setpoints, controlling the temperature conditioning unit in accordance with the temperature value of the corresponding desired setpoint;*

*after receiving one of the plurality of desired setpoints, waiting for a time period to see if additional ones of the plurality of desired setpoints are received during the time period, and after the time period expires, updating the learned setpoint schedule based, at least in part, on one or more of the plurality of desired setpoints received during the time period; and*

*controlling the temperature conditioning unit in accordance with the learned setpoint schedule.*

*23. The method of claim 22 wherein the time period is part of a day.*

*24. The method of claim 22 wherein the time period is a day or more.*

*25. The method of claim 22 wherein the time period is a week or more.*

*26. A method for controlling a temperature conditioning unit of a building, comprising:*

*storing a learned setpoint schedule comprising a plurality of learned desired setpoints;*

*receiving via a user interface a plurality of desired setpoints that each comprise a temperature value and a time value;*

*attempting to identify a pattern based, at least in part, on: (1) one or more of the plurality of desired setpoints; or (2) one or more of the plurality of discrete setpoints of the learned setpoint schedule and one or more of the plurality of desired setpoints;*

*if a pattern is identified, establish a learned setpoint based at least in part on the identified pattern; and*

*updating the learned setpoint schedule to include the learned setpoint.*

*27. A method for controlling a temperature conditioning unit of a building, comprising:*

*without first manually activating a learn mode switch to enter a learning mode:*

*receiving via a user interface a plurality of desired setpoints, wherein each of the plurality of desired setpoints comprises a temperature value and a time value;*

*attempting to identify a pattern based, at least in part, on two or more of the plurality of desired setpoints, and if a pattern in identified, establish a learned setpoint based at least in part on the identified pattern; and*

*updating a learned setpoint schedule to include the learned setpoint.*

* * * * *